Dec. 31, 1968  G. DIEPENHORST ET AL  3,419,297
SELF-ADJUSTING ASSEMBLY AND METHOD FOR FORMING SAME
Filed June 1, 1967
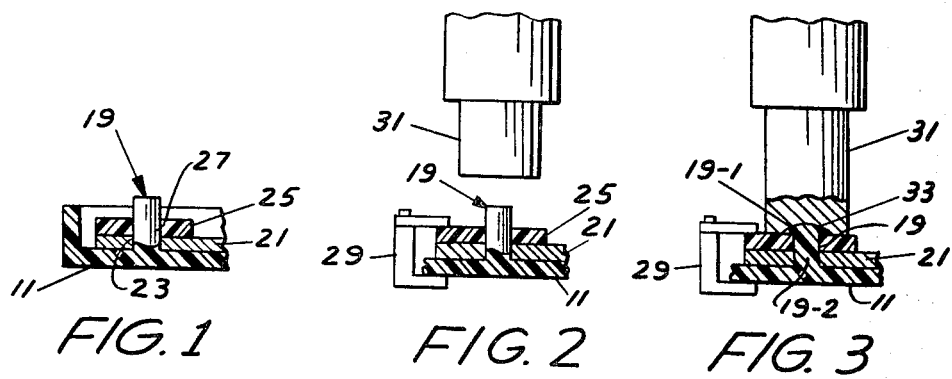
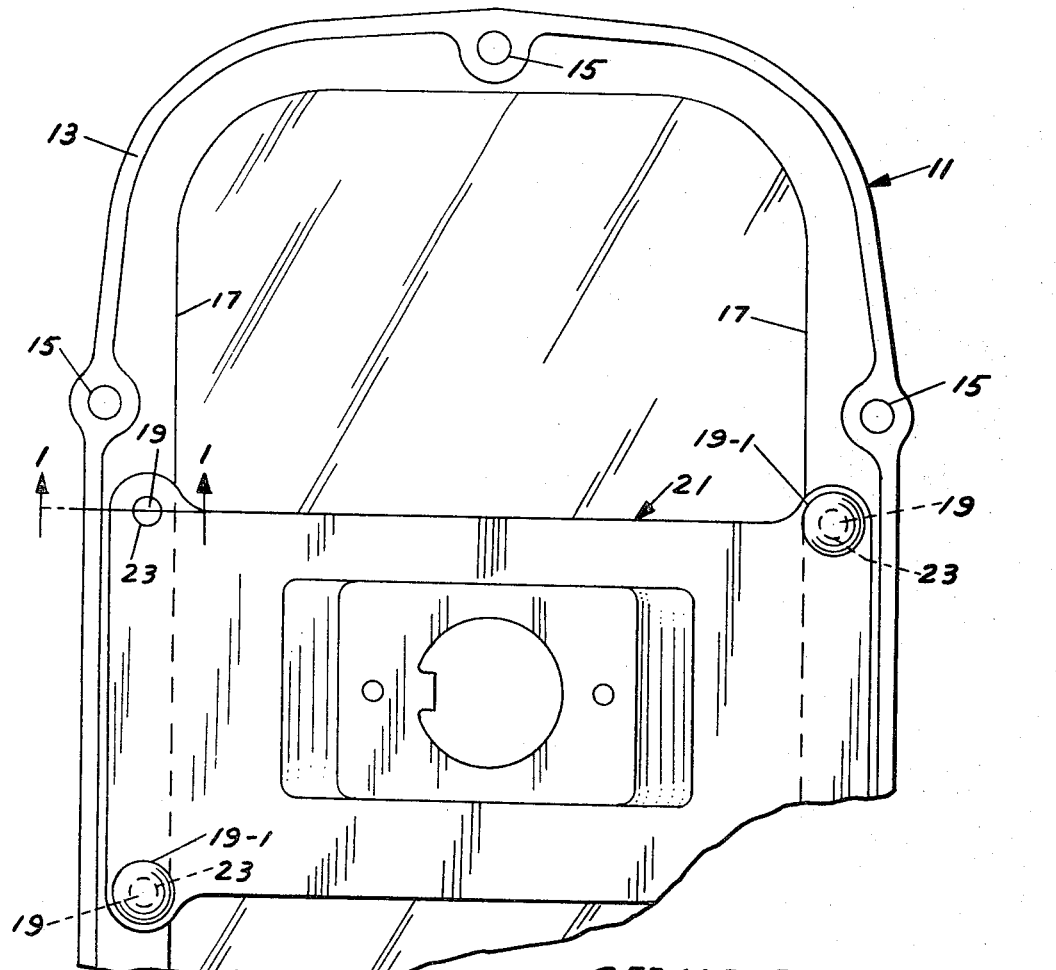
GERALD DIEPENHORST
MARVIN O. FLETEMIER
INVENTORS
BY John R. Faulkner
Olin B. Johnson
ATTORNEYS United States Patent Office
3,419,297
Patented Dec. 31, 1968

3,419,297
SELF-ADJUSTING ASSEMBLY AND METHOD FOR FORMING SAME
Gerald Diepenhorst, Romulus, and Marvin O. Fletemier, Plymouth, Mich., assignors to Ford Motor Company, Dearborn, Mich., a corporation of Delaware
Filed June 1, 1967, Ser. No. 642,846
5 Claims. (Cl. 287—189.36)

ABSTRACT OF THE DISCLOSURE

A method for fastening a thermoplastic object having a projecting stud thereon to a metal part which comprises placing said metal part on the side of said thermoplastic object bearing said stud positioning upon said metal part a thermally compensating spring, upsetting the end of said stud with heat and pressure and forming a rivet-like head thereon extending over the shank of said stud thereby forming an assembly wherein said metal part and said spring are positioned between said thermoplastic object and said head, heating at least a portion of said stud shank while said thermoplastic object, said metal part and said spring are held in said assembly, cooling said head, cooling said stud shank, and controlling the tightness of said assembly at the temperature of assembly by thermally induced stress in said stud; and an assembly prepared by such method.

Background of the invention

Many articles of manufacture employ both metal and thermoplastic components and the need exists for fastening such components together in a manner that is rapid, efficient and serviceable under varying conditions. A variety of methods have been used to fasten together such articles. These methods include mechanical fastening with metal clips or bolts, heat staking wherein metal studs projecting from a metal part are inserted into an opening in a thermoplastic part and the metal part is heated until the thermoplastic adjacent the stud is converted from solid to thermoplastic state and subsequently cooled, and upsetting the end of a metal stud projecting from the metal part and extending through the thermoplastic part thereby holding the thermoplastic object between two metal surfaces. Each of these methods are suitable for use under certain conditions and unsuitable under others.

Because of the readily workable nature of thermoplastic materials, it is often more desirable to effect the fastening of such articles by what may be called "plastic riveting." In such method, a thermoplastic member projects from the thermoplastic part, is inserted through an opening in the metal part, and the projecting end thereof is upset with heat and pressure to form a rivet-like head so as to hold the metal part between such head and the body of the thermoplastic part. It will be understood that such thermoplastic members may be integral with the body of the thermoplastic part or passed through an opening in the thermoplastic part in which case the other end of such member must also be upset or have an otherwise formed head sufficient to prevent such end from passing through the thermoplastic part.

Where such a fastening is maintained at a substantially constant temperature, this method may be satisfactorily employed. If, however, the fastening is subsequently subjected to wide temperature differentials, the different rates of thermal expansion and contraction exhibited by the plastic part and by the metal part render such fastenings ineffective and/or inoperative. The more rapid expansion of the thermoplastic part or parts and the less rapid expansion of the metal part or parts at temperatures above the fastening temperature will cause the connection to loosen beyond the required minimum serviceable tightness. The more rapid contraction of the thermoplastic part or parts and the less rapid contraction of the metal part or parts at temperatures below the fastening temperature will impose undue stress upon the plastic rivet and can effect shearing of the rivet head or a break in the rivet shank.

Summary of the invention

It has been discovered that the assembly of a thermoplastic object and a metal part can be maintained at an essentially constant degree of tightness if a thermally compensating member having proper thickness and expansion-contraction characteristics is interposed between components of the assembly at the time of fastening and the original tightness of the assembly is effected by thermally induced stress.

In the preferred embodiment, the product of the thickness and the coefficient of thermal expansion of the compensator is equal to the difference between the product of the length of the thermoplastic shank of the rivet and its coefficient of thermal expansion and the product of the thickness of the metal part and its coefficient of thermal expansion.

Brief description of the drawing

FIGURE 1 is a sectional view taken along line 1—1 illustrating an assembly of parts in accordance with this invention prior to clamping of such parts and prior to upsetting the rivet shank to close the assembly;

FIGURE 2 is a partially sectional view showing an assemblage of parts as shown in FIGURE 1 in clamped relationship with the operative end of an upsetting tool approaching the exposed end of the rivet shank;

FIGURE 3 is a partially sectional view of the assembly of FIGURE 2 after the rivet shank has been upset and cooling of the resultant rivet head and the rivet shank is being effected; and FIGURE 4 is a partial plan view of a tail lamp assembly wherein the method of this invention is employed to secure a thermoplastic lens to a metal lamp holder.

Description of the preferred embodiments

The method of this invention is illustrated by the fastening of a lamp holder or lamp support means upon the inner surface of an automobile tail lamp lens. It will be understood by those skilled in the art that this use of the method is purely exemplary and that this method is suitable for a wide variety of plastic-metal fastenings including, but not by way of limitation, the fastening of decorative metal trim upon plastic objects.

In the drawing, a conventional thermoplastic lens 11 has a peripheral mounting flange 13 in which are positioned a plurality of spaced apart apertures 15 through which fastening means can be inserted for fastening lens 11 to the automobile body. Lens 11, a conventional acrylic-type plastic lens material, is substantially dish-shaped and has an inwardly extending peripheral flange 17 positioned inwardly from flange 13. Studs 19 project from flange 17 and are composed of the same thermoplastic material as the remainder of lens 11 and are integrally formed therewith. A metal lamp holder 21 having a plurality of apertures 23 is shown mounted on lens 11 with studs 19 extending through apertures 23.

Referring now to FIGURES 1–3, there is shown directly above metal lamp holder 21, a thermal compensator 25. Compensator 25 in this embodiment is a sheet of polyethylene which acts as a thermally activated spring when the fastening of the assembly is complete. Compensator 25 has a plurality of apertures 27 through which the studs 19 are inserted.

Before the fastening of the assembly is completed, lens 11, metal lamp holder 21 and compensator 25 are clamped to the desired degree of tightness by a plurality of clamping means here illustrated by clamp 29.

When the assembly is properly clamped, an upsetting tool 31 having a concave working face 33 is brought to bear upon the exposed end of thermoplastic stud 19. In this embodiment, the face 33 of upsetting tool 31 is maintained at a temperature in the range of about 300° to 325° F. during the upsetting procedure. When the end of stud 19 is heated to plastic state, tool 31 is pressed downward upon the exposed head of stud 19 with a pressure sufficient to upset the end of stud 19 and bring the periphery of the upset portion into contact with compensator 25 thereby forming a rivet-like head 19–1. The heated tool is maintained in contact with head 19–1 until at least a portion of the shank 19–2 of stud 19 is also heated. It will be understood that face 33 may have projections from or indentations in its surface for the purpose of forming a decorative design on the surface of head 19–1.

With the assembly still held in place by the clamps 29, head 19–1 and subsequently shank 19–2 are cooled until conversion of the head 19–1 from the plastic state to the solid state is effected. If a portion of shank 19–2 has been heated to plastic state, the clamps 29 will not be removed until such portion has also been cooled to solid state. This may be brought about by cooling the end of the upsetting tool, e.g., by circulating air, water, oil, etc., therethrough, or by withdrawing the upsetting tool and contacting head 19–1 with a similarly disposed surface maintained at a temperature below the temperature at which the thermoplastic material of stud 19 converts from solid to plastic state, e.g., to about 180° F. or less.

After head 19–1 has been returned to solid state, the subsequent cooling of shank 19–2 provides the initial or fastening tightness of the assembly. Shank 19–2 in cooling would undergo dimensional change were not its dimensions already established in that the previously cooled head 19–1 will not pass through aperture 27 in compensator 25. Since shank 19–2 cannot undergo significant dimensional change, the energy of contraction is manifest in the creation of tension which holds the component parts of the assembly in the desired degree of tightness at the assembly temperature existing at the time of fastening. The degree to which shank 19–2 is heated prior to cooling determines the initial tightness of the assembly. The depth and intensity to which shank 19–2 will be heated with tool 31 maintained at a given temperature is time dependent for a shank of given cross-sectional area. For a given assembly, a reasonable amount of routine testing upon a sample assembly will give the time and temperature most satisfactory for providing the desired degree of initial tightness. In FIGURE 4, two of the fastenings are complete as evidenced by the heads 19–1 while the remaining fastening unit shown is incomplete with sutd 19 shown in original form.

In the preferred embodiment, the product of the thickness and the coefficient of thermal expansion of the compensator 25 is equal to the difference between the product of the length of shank 19–2 and the coefficient of thermal expansion thereof and the product of the thickness of the metal lamp holder 21 and its coefficient of thermal expansion. Some deviation from the ideal is acceptable with defined temperature ranges. However, the greater such deviation, the narrower the operative temperature range for the assembly. Acceptable deviation from ideal thickness can be calculated for a given temperature range. Thus, when the product of the thickness and coefficient of thermal expansion of the compensator is said to be substantially equal to the difference the corresponding products for the rivet shank and the metal component, the term "substantially equal" will be understood to correspond to the range of acceptable deviation as hereinafter defined.

The mechanically induced and thermally induced forces present in a three component riveted assembly as hereinbefore described are represented by the following formula.

FORMULA I

*Increments of first component*

$$\Sigma \left[ \frac{Pa_1L_1}{Aa_1Ea_1} + (Ta_1 - T_o)Ka_1L_1 \right] +$$

$$\left[ \frac{Pa_2L_2}{Aa_2Ea_2} + )Ta_2 - T_o)Ka_2L_2 \right] + \ldots$$

*Increments of second component*

$$+ \Sigma \left[ -\frac{Pb_1L_1}{Ab_1Eb_1} + (Tb_1 - T_o)Ka_1L_1 \right] +$$

$$\left[ -\frac{Pb_2L_2}{Ab_2Eb_2} + (Tb_2 - T_o)Kb_2L_2 \right] + \ldots$$

*Increments of third component*

$$+ \Sigma \left[ -\frac{Pc_1L_1}{Ac_1Ec_1} + (Tc_1 - T_o)Kc_1L_1 \right] +$$

$$\left[ -\frac{Pc_2L_2}{Ac_2Ec_2} + (Tc_2 - T_o)Kc_2L_2 \right] + \ldots$$

wherein:

$a$ = first component
$b$ = second component
$c$ = third component
$A$ = cross sectional area, in.$^2$
$E$ = modulus of elasticity
$K$ = thermal coefficient of expansion, in./in./° F.
$L$ = length (or thickness as case may be), in.
$P$ = tension, lbs.
$T$ = temperature, ° F.
$T_o$ = 0° F.
$\Sigma$ = summation When the thickness and coefficient of thermal expansion are known for the portions of the thermoplastic object and the metal part within the assembly, i.e., between the rivet heads, a portion of this general formula may be utilized in the following manner to determine the ideal thickness for a compensator of known composition.

FORMULA II $$\Sigma[(Ta_1 - T_o)Ka_1L_1] + [(Ta_2 - T_o)Ka_2L_2] + \ldots$$

$$-\Sigma[(Tb_1 - T_o)Kb_1L_1] + [(Tb_2 - T_o)Kb_2L_2] + \ldots$$

$$-\Sigma[(Tc_1 - T_o)Kc_1L_1] + [(Tc_2 - T_o)Kc_2L_2] + \ldots = 0$$

Given:

| Drawing identification No.: | Length | Coefficient of thermal expansion |
|---|---|---|
| 19 | .032 | $39 \times 10^{-6}$ |
| 21 | .020 | $6.3 \times 10^{-6}$ |
| 25 |  | $94.4 \times 10^{-6}$ |

Substituting the given figures in the formula immediately above, the ideal thickness for the compensator is found to be .012 in.

Where the assembly is to be subjected to a given temperature range, the maximum acceptable thickness and the minimum acceptable thickness for a compensator for use in such range can be determined in the following manner. Insert in Formula I the lowest temperature of the range, the coefficient of thermal expansion for each of the components, the length of the thermoplastic stud (between rivet heads, the body of the thermoplastic part serving as one rivet head in the illustrated embodiment), the thickness of the metal 21, and a selected value for $P/A$, said value being the maximum value allowable in view of the strength of the given thermoplastic stud at the temperature chosen. If one then solves for the thickness of the compensator, $c$, the figure obtained represents the minimum acceptable thickness for this temperature. This process is then repeated with the single exception that one now inserts for $P/A$ the minimum acceptable tightness for such assembly. If one then solves for the thickness of the compensator, the figure obtained will represent the maximum acceptable thickness for this compensator in this assembly at this temperature.

If the aforedescribed process is repeated for the highest temperature of the range, a maximum and minimum acceptable compensator thickness will be obtained for the top of the temperature range.

Since the assembly is to be subjected to the entire temperature range, the compensator thickness should be no greater than the smaller of the calculated maximum and no less than the larger of the calculated minimums.

The difference between the range maximum and the ideal thickness and the difference between the range minimum and the ideal thickness each constitute herein the extent of acceptable deviation from ideal thickness.

The assembly hereinbefore illustrated was tested in the following manner: The assembly was first heated at 150° F. in air at 100% relative humidity for 24 hours. It was then temperature cycled from −30° F. to 150° F. for 5 days. Following this, the assembly was subjected to conventional vibration tests. The assembly did not break during the test and at the end thereof exhibited apparent original tightness.

While the assembly and the method of forming such assembly has been described with three components, it will be understood by those skilled in the art that one or more additional metal and/or plastic components may be inserted into this assembly if the methods herein described are extended to take into consideration corresponding values for each of the components.

We claim:

1. A method for fastening a metal object to a thermoplastic object having a thermoplastic stud projecting from a side thereof, said method comprising positioning said metal object to the side of said thermoplastic object bearing said stud, positioning upon said metal part a thermally compensating spring of organic material, upsetting the end of said stud with heat and pressure and forming a rivet-like head thereon which extends outwardly from the remaining shank of said stud and forms an assembly wherein said metal part and said spring are positioned between said thermoplastic object and said head, heating at least a portion of said stud shank while said thermoplastic object, said metal object and said thermally compensating spring are held in said assembly, cooling said head, cooling said stud shank, and providing the resultant assembly with a predetermined tightness at assembly temperature by controlling the heating of said stud shank within predetermined limits thereby controlling the degree of stress thermally induced therein when the heated shank is cooled to assembly temperature.

2. The method of claim 1 wherein said thermally compensating spring is a sheet of polymeric material further characterized in that the product of its thickness and thermal coefficient of expansion is substantially equal to the difference between the product of the length of said shank and its thermal coefficient of expansion and the product of the thickness and thermal coefficient of expansion of said metal object.

3. The method of claim 1 wherein said metal object and said thermally compensating spring each have an aperture therein through which said stud extends when the projecting end thereof is upset.

4. An article of manufacture comprising a thermoplastic rivet having at each of the ends thereof a head of greater cross sectional area than the shank of said rivet extending therebetween, said rivet holding between its heads a metal object and a thermally compensating spring of organic material, said thermally compensating spring being further characterized in that the product of its thickness between said rivet heads and its coefficient of thermal expansion is substantially equal to the difference between the product of the length of said shank and its thermal coefficient of expansion and the product of the thickness of said metal object between said rivet heads and its thermal coefficient of expansion.

5. An article of manufacture in accordance with claim 4 wherein the product of the thickness of the thermally compensating spring between said rivet heads and its thermal coefficient of expansion is equal to the difference between the product of the length of said shank and its thermal coefficient of expansion and the product of the thickness of said metal object between said rivet heads and its thermal coefficient of expansion.

References Cited

UNITED STATES PATENTS

| 2,510,693 | 6/1950 | Green | 85—37 |
| 3,308,225 | 3/1967 | Wells | 264—249 |

EDWARD C. ALLEN, *Primary Examiner.*

U.S. Cl. X.R.

85—37; 264—249